(12) United States Patent
Kim (10) Patent No.: US 10,470,500 B2
(45) Date of Patent: Nov. 12, 2019

(54) PROTECTION NET ON WHICH A PURSE OR A BIB IS ATTACHED

(71) Applicant: Dong Jin Kim, Los Angels, CA (US)

(72) Inventor: Dong Jin Kim, Los Angels, CA (US)

( * ) Notice: Subject to any disclaimer, the term of this patent is extended or adjusted under 35 U.S.C. 154(b) by 0 days.

(21) Appl. No.: 15/640,397

(22) Filed: Jun. 30, 2017

(65) Prior Publication Data

US 2019/0000151 A1   Jan. 3, 2019

(51) Int. Cl.
*A41B 13/00* (2006.01)
*A41B 13/10* (2006.01)

(52) U.S. Cl.
CPC .................. *A41B 13/106* (2013.01)

(58) Field of Classification Search
CPC .................................... A41B 13/106
See application file for complete search history.

(56) References Cited

U.S. PATENT DOCUMENTS

| | | | | |
|---|---|---|---|---|
| 2,260,584 A * | 10/1941 | Schuck | ..................... | A47D 7/04 24/370 |
| 4,634,618 A * | 1/1987 | Greer | ..................... | A47G 9/062 383/127 |
| 4,903,873 A * | 2/1990 | Poole | ....................... | A41D 7/00 224/158 |
| 4,963,138 A * | 10/1990 | Braun, Jr. | .............. | A61B 17/42 182/138 |
| 5,492,256 A * | 2/1996 | Ive | ....................... | A47D 13/025 220/528 |
| 5,529,341 A * | 6/1996 | Hartigan | ................. | B60R 21/06 280/749 |
| 5,694,866 A * | 12/1997 | Muller | ..................... | A47C 7/66 108/161 |
| 5,795,009 A * | 8/1998 | Sack | ........................ | B62J 19/00 150/167 |
| 5,934,528 A * | 8/1999 | Higuchi | ............... | A47D 13/025 224/159 |
| 6,182,931 B1 * | 2/2001 | Richard | ............... | B60N 2/6009 108/44 |
| 6,237,998 B1 * | 5/2001 | Aprile | ..................... | B62B 3/144 297/219.12 |
| 6,325,259 B1 * | 12/2001 | Tharalson | ............ | A47D 13/025 224/159 |
| 7,530,635 B2 * | 5/2009 | Schramek-Flye | ...... | A47D 1/103 297/17 |
| 7,661,566 B2 * | 2/2010 | Yoshie | ..................... | A45F 4/02 224/158 |
| 7,806,475 B2 * | 10/2010 | Coady | .................... | A47D 1/103 297/219.12 |
| 9,968,178 B2 * | 5/2018 | Frazer | ....................... | A45F 3/52 |
| 2005/0279785 A1 * | 12/2005 | Liistro | ................. | A47D 13/025 224/160 |
| 2009/0025843 A1 * | 1/2009 | Keeler | ..................... | B62J 19/00 150/167 |
| 2011/0253274 A1 * | 10/2011 | Schreiber | ................. | B60J 11/04 150/167 |

* cited by examiner

*Primary Examiner* — Tri M Mai (57) ABSTRACT

It is very common phenomenon that babies drop their toys or spoons down on the floor or ground while they playing with toys or eating food with spoons as sitting on the baby carriage or babies' chair.
The present invention is a protection net on which a purse or bib is attached; which is designed to catch a toy or spoon when one-to-three-year-old baby drops his or her toy or spoors, down while he or she plays with a toy or eating food with a spoon as sitting on the babies' chair or babies' carriage.

1 Claim, 9 Drawing Sheets

PROTECTION NET ON WHICH A PURSE OR A BIB IS ATTACHED

CROSS REFERENCE TO RELATED APPLICATIONS

Not Applicable

FIELD OF INVENTION

The present invention is a product used as a protection net attached to a purse or baby bib in order to prevent babies from dropping their spoons or toys down on the ground while sating or playing as sitting on babies' chair or babies' carriage.

BACKGROUND OF INVENTION

It is very common phenomenon that babies drop their toys or spoons down on the floor or ground while they playing with toys or eating food with spoons as sitting on the baby carriage or babies' chair. Usually babies' mom grab them back for them so that babies could reuse them.

After they receive them from their mothers, they usually suck them again with their mouth. It causes a lot of hygiene issues for babies even though their mothers clears them up before they give them back to their babies.

Even though, if this kind of babies' dropping happened at home, the mothers could wash the dropped toys or spoons cleanly by using water, if it happened outside, the mothers could do usually clean the toys or spoons only with tissues or cloths without water, which might cause a serious hygiene problems for babies.

The present invention is designed to protect babies health by removing babies' hygiene issues beforehand in the situations above. The present author believes that the present invention should be contributing to protecting and maintaining the babies health and hygiene.

SUMMARY OF INVENTION

The present invention is a protection net on which a purse or bib is attached. The protection net is designed to receive a toy or spoon when one-to-three-year-old baby drops his or her toy or spoons down while he or she plays with a toy or eating food with a spoon as sitting on the babies' chair or babies' carriage.

Considering daily life of a baby who is one to three year old, he or she usually plays with a toy most of the time except for sleeping time. When a mother tries to feed her baby, it is very common that she let her baby sit down on the baby chair and wear a bib. While the mother feeds her baby with food, the baby often drops his or her toy down as he or she continuously plays with a toy.

Sometimes they drop a spoon or a toy down on the ground. In which time, their mothers usually grab those toys or spoons without consciousness and cleans them up roughly and then they give them to their babies back.

In addition, babies even drop their smart phones down and eventually, break those smart phones up while they play with it by watching a game screen.

It is predictable that babies could continuously experience this kind of droppings in the future because there is no protection net attached to a preexisting bib, which is made for the purpose of preventing a bay from dropping a toy or a spoon etc. down.

Sometimes, we eat out with a bay who is one to three year old. First, we bring a baby chair to the front of a dining table and let the baby sit on the chair and then let the baby wear the bib around the neck.

However, babies drop their toys on the dirty floor of restaurant while they play with toys and sometimes drop the spoons down. Whenever the babies drop toys or spoons on the floor, mothers grab them and give them back to the babies after they roughly clean them up.

After babies receive those toys or spoons back, they often suck them up with their mouth. Those behaviors are not only unhygienic but also a very serious problem for babies who has a weak immunity.

The present invention is a product which can make it possible to completely resolve those unhygienic and unhealthy problems above.

BRIEF DESCRIPTION OF DRAWINGS

Various features, aspects and merits of present invention is better understood by referring to the attached drawings.

DETAILED DESCRIPTION EMBODIMENTS OF INVENTION

Figure 1:
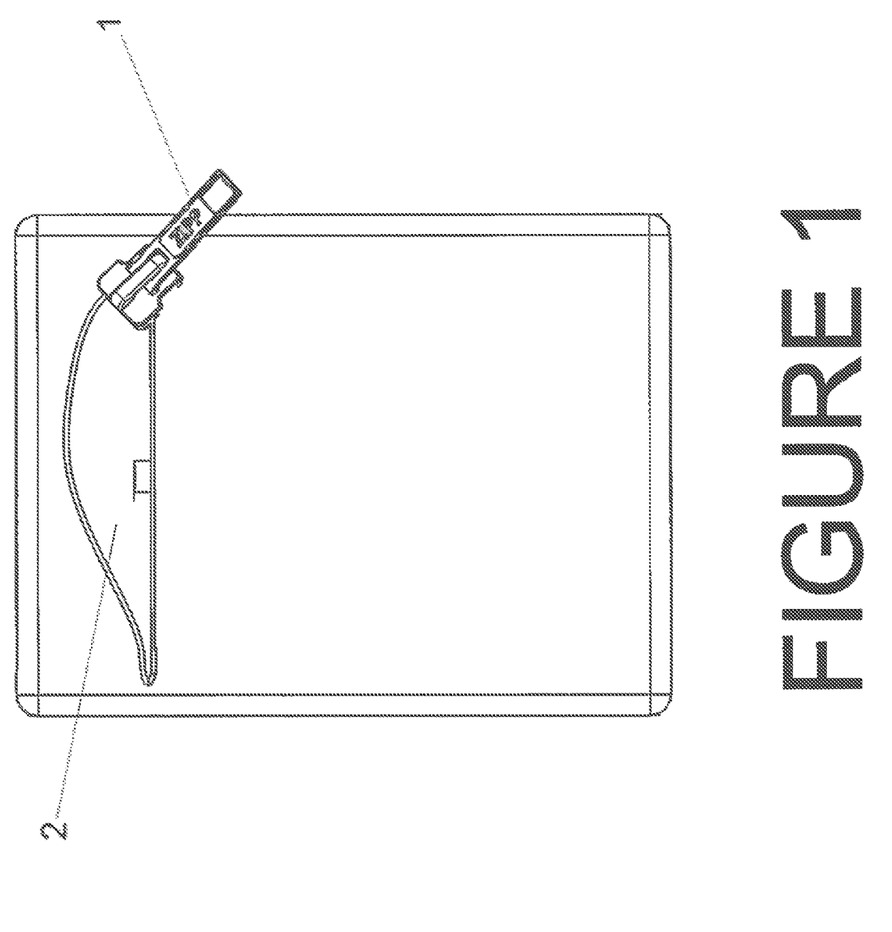
FIG. 1 shows a front elevation view of a purse containing a protection net within itself

As shown in FIG. 1, inside of purse 2 with zipper 1, there is a protection net as being attached to the purse.

Figure 2:
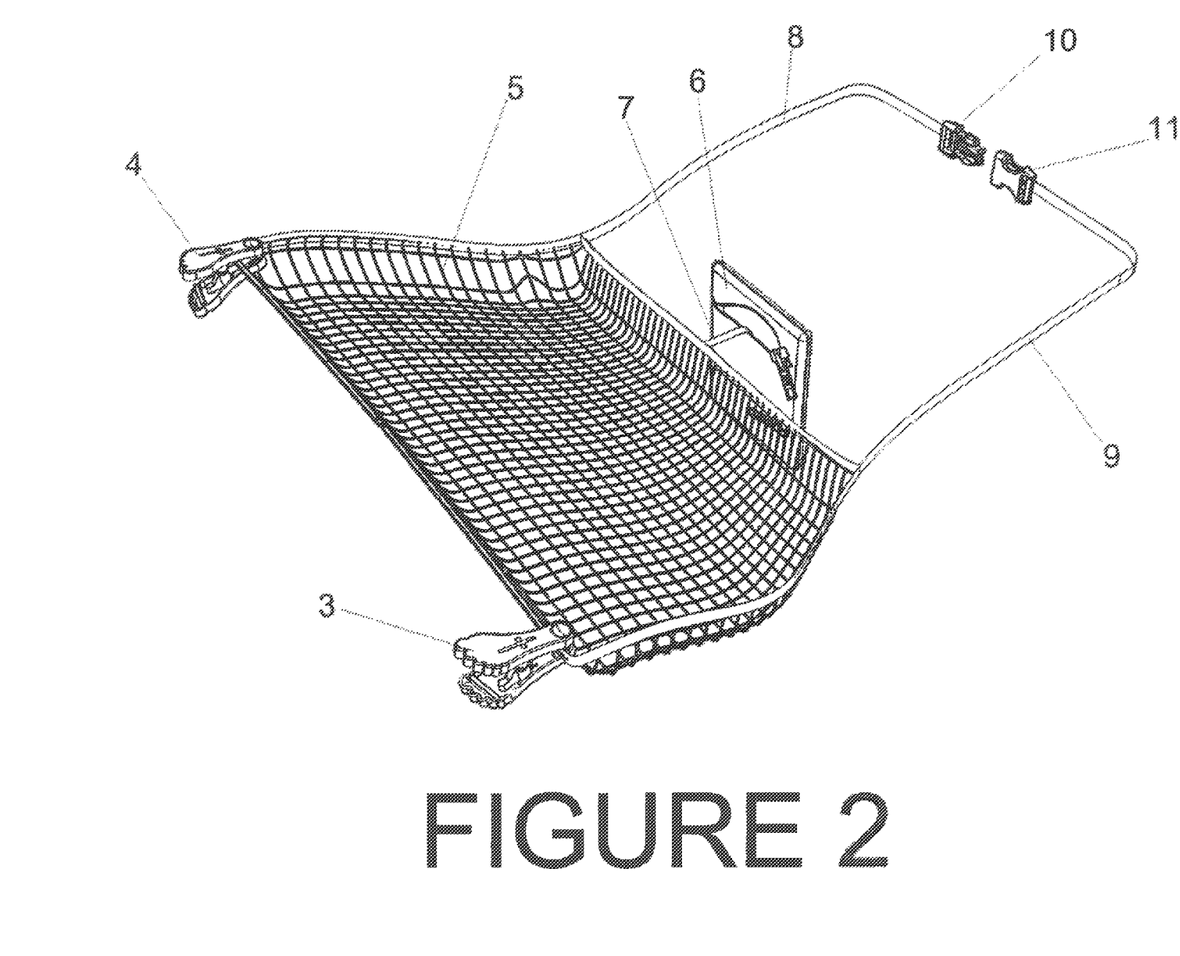
FIG. 2 shows a perspective view of a protection net on which a purse is attached when a protection net came out of the purse

When the protection, net 5 came out of the purse 6 as shown in FIG. 2, it is shown to be attached to the purse 6 through a connecting string 7.

At the right front corner of the protection net 5, a clip 3 is attached and another clip 4 is attached at the left front corner of the protection net 5.

At the right rear corner of protection net 5, a connecting string 3 is attached and at the end of the string 9, a female closer is attached.

At the left rear corner of protection net, the other connecting string 8 is attached and at the end of the string 8, a male closer 10 is attached.

Figure 3:
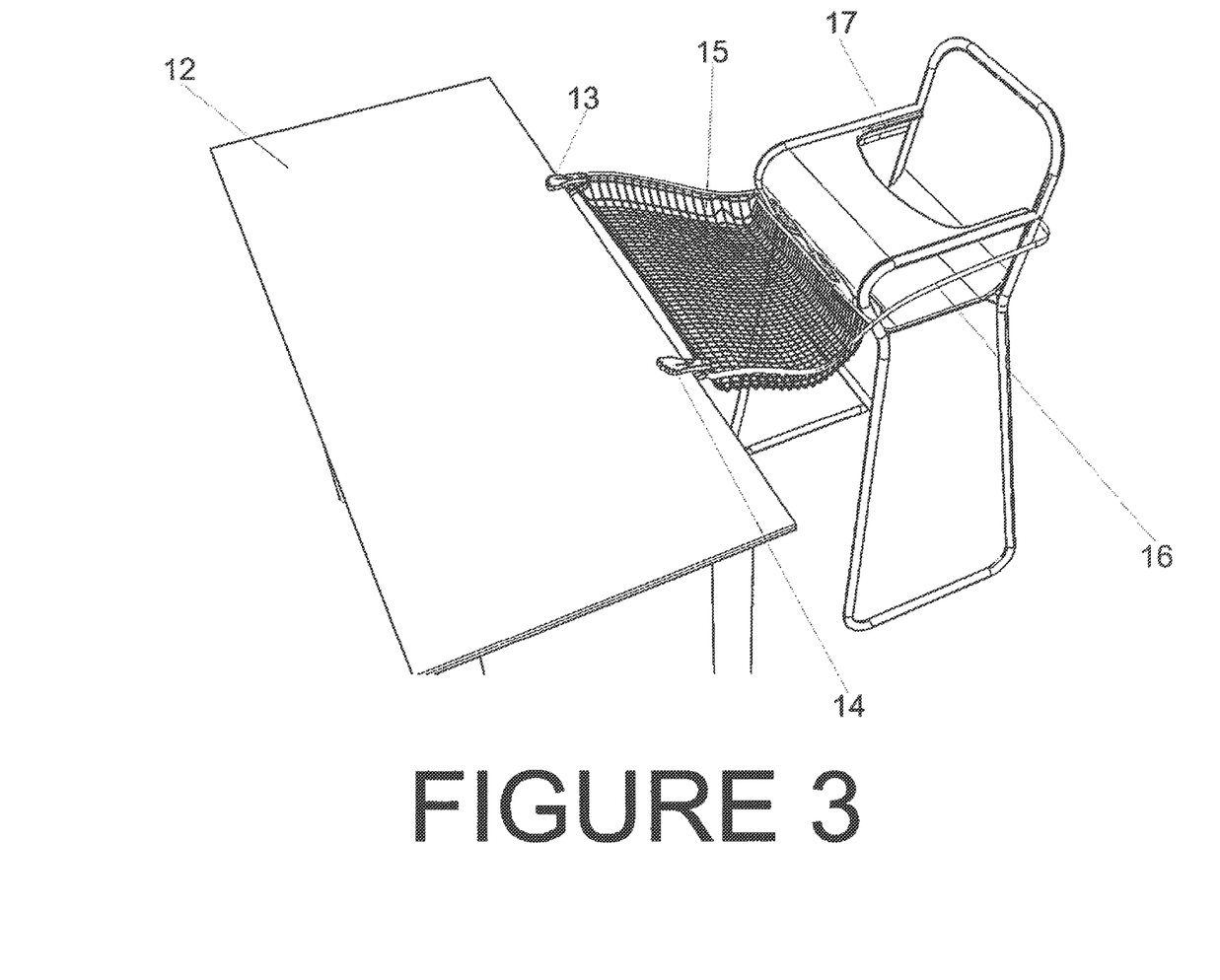
FIG. 3 shows a perspective view of a protection net on which a purse is attached when it is combined with a table and a baby chair
Figure 4:
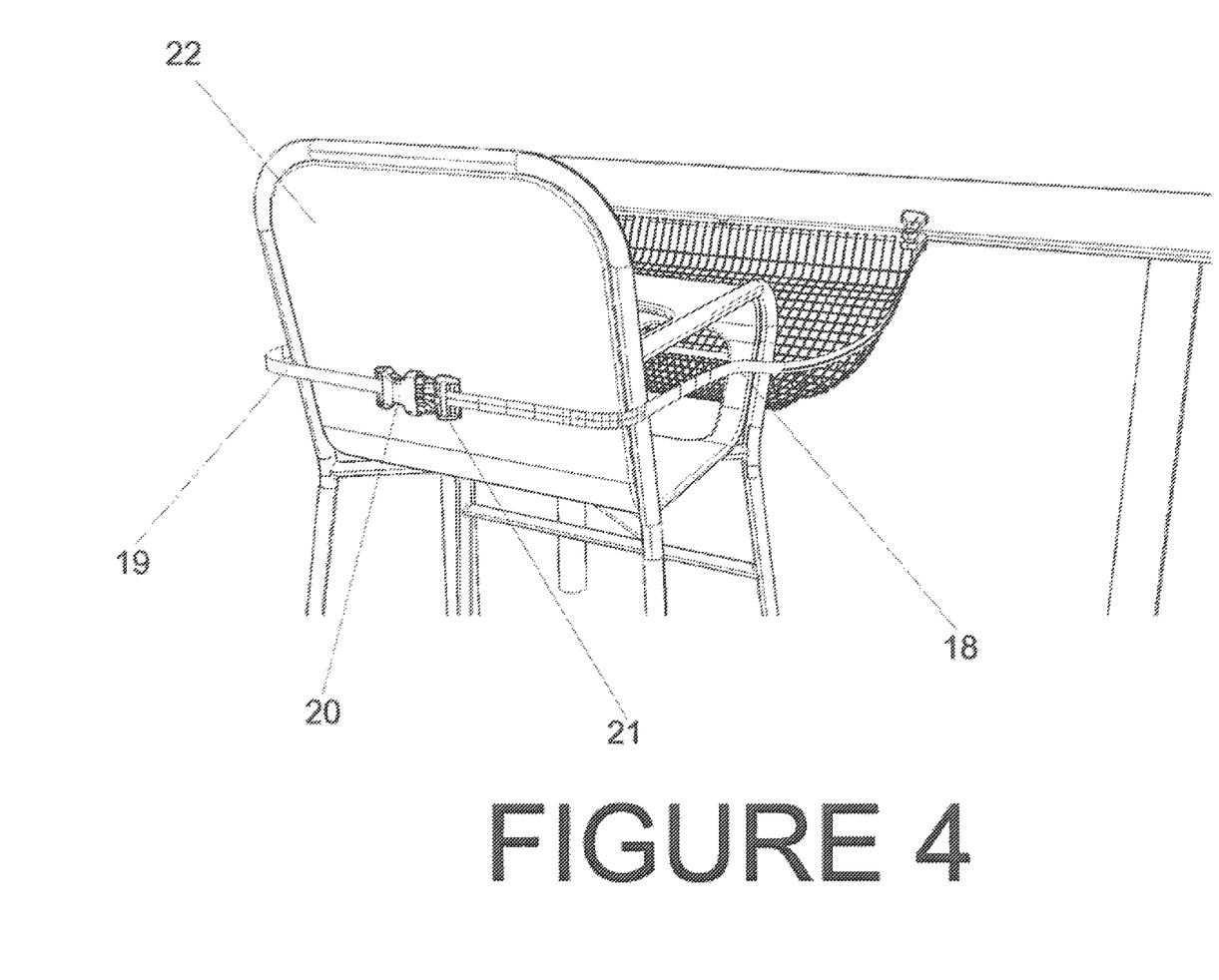
FIG. 4 shows a roar side perspective view of a protection net on which a purse is attached when the protection net is combined with a table and baby chair.

As shown in FIG. 3, the protection net 15 on which a purse is attached is connected with a table 12 through a clip 14 at the right corner of protection net and a clip 13 at the left corner of protection net.

The string 16, 19 combined with the rear right corner of protection net and the string 17, 18 combined with the rear left corner of protection net are connected with a baby chair 22 as a male closer 21 goes into the female closer 20.

This invention is designed to prevent a baby from dropping a toy or a spoon down on the ground or floor while he or she plays with a toy or eats food with a spoon as sitting on the baby chair in front of the table.

Figure 5:
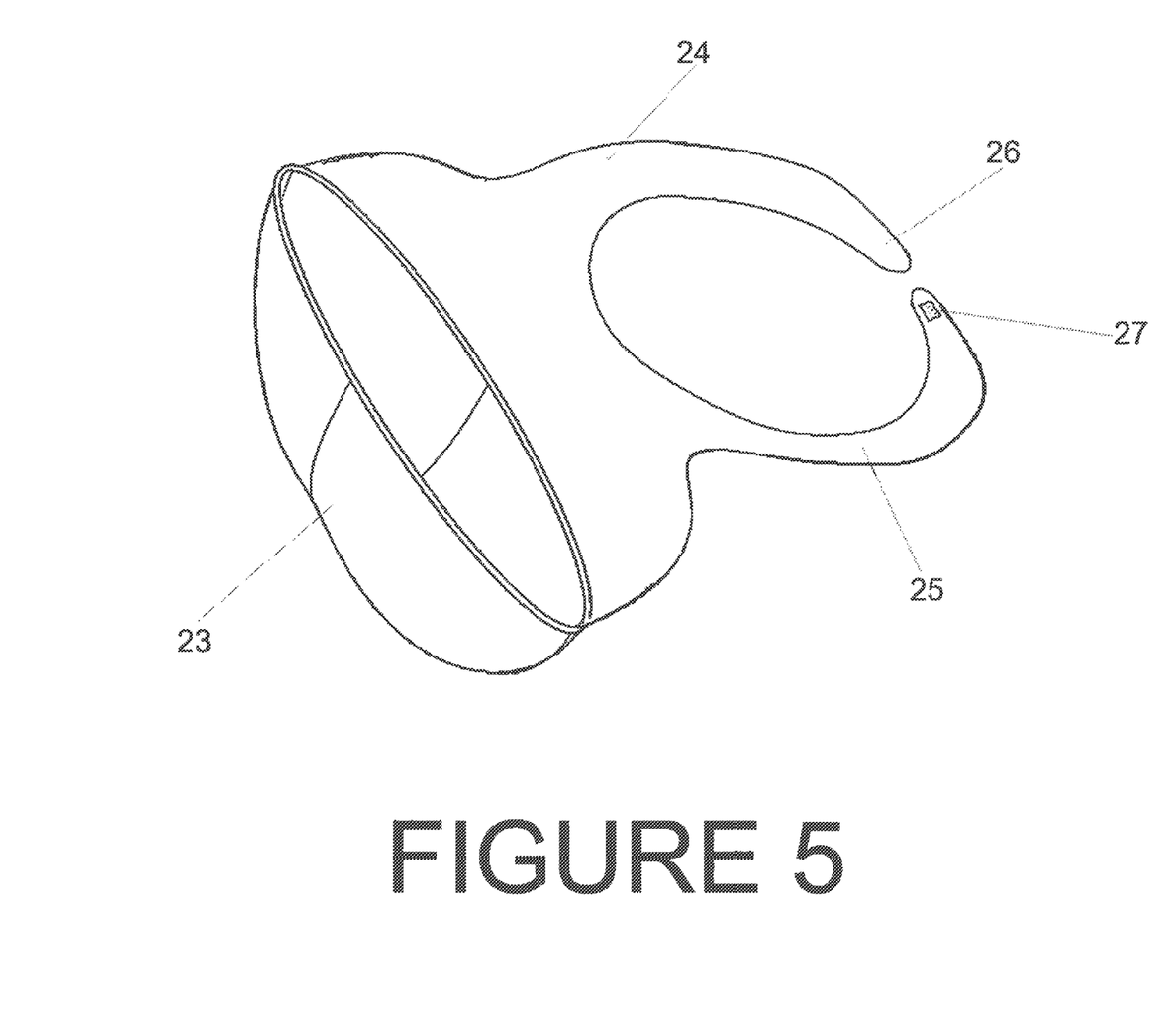
FIG. 5 shows a perspective view of a baby bib

As shown in FIG. 5, it shows a baby bib which is widely and generally used for babies. It is not submitted for a patented idea but only used as an instrument to which a protection net is attached.

Figure 6:
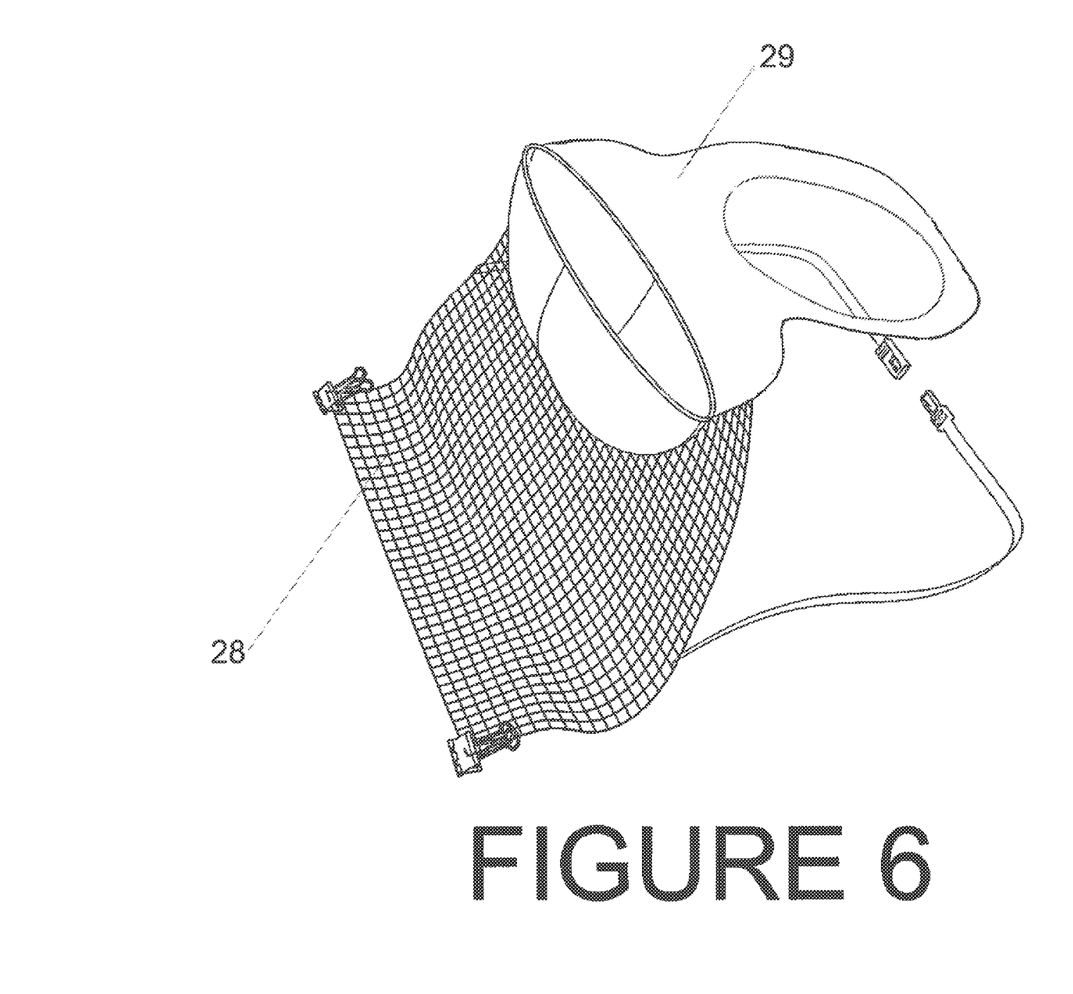
FIG. 6 shows a perspective view of a protection net combined with a baby bib
Figure 7:
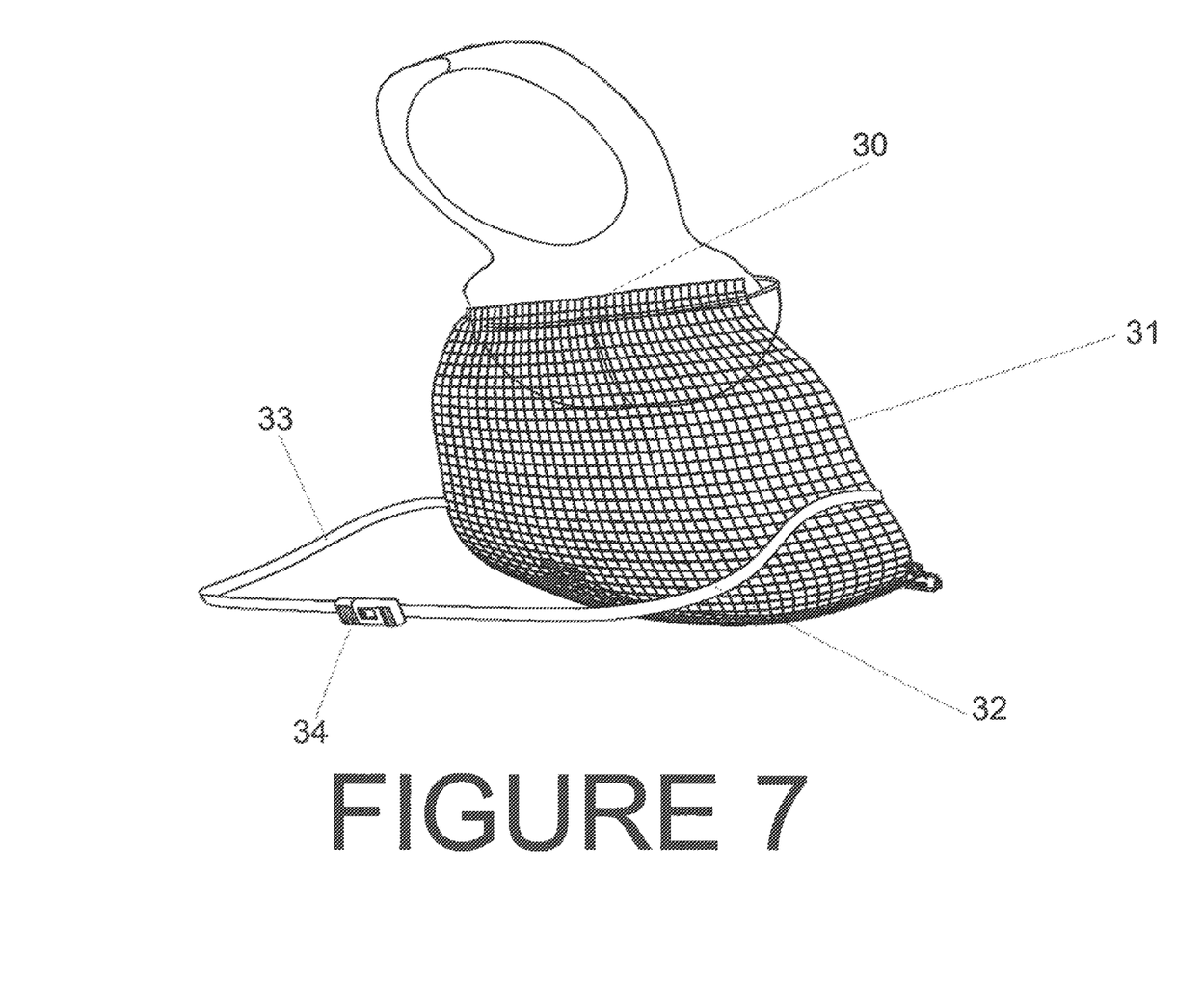
FIG. 7 shows a rear perspective view of a protection net combined with a baby bib.

As shown in FIG. 6, a protection net 28 is combined with a baby bib 29. As shown in FIG. 7, the protection net 31 is combined with a bib by way of using adhesive or stitching etc.

Figure 8:
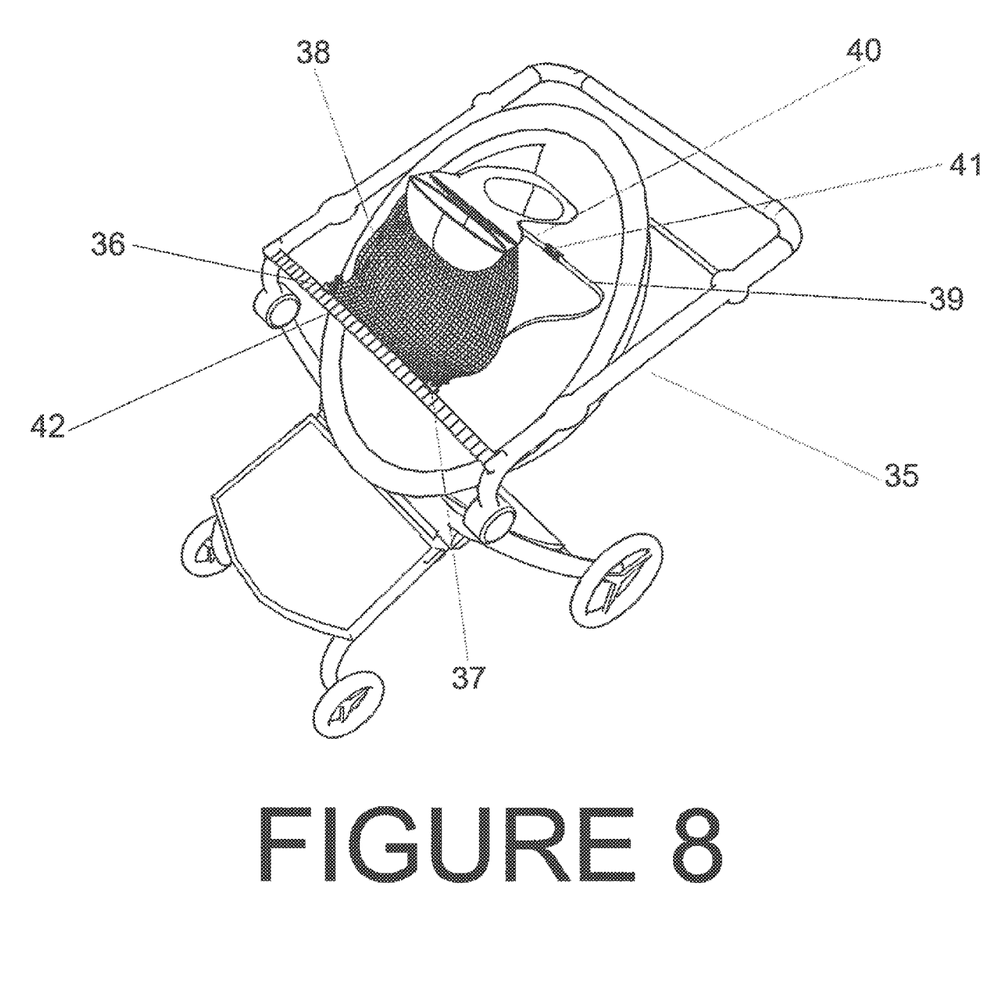
FIG. 8 shows a perspective view of a protection net combined with a baby bib when it is attached to a baby carriage.

As shown in FIG. 8, the protection net 38 is connected to the front buttressing bar 42 of baby carriage 35 through the clip 37 at the right corner of protection net 38 and the clip 36 at the left corner of protection net.

The right string 39 is connected to the left string 38 through the combination of the male closer and female closer 40.

Figure 9:
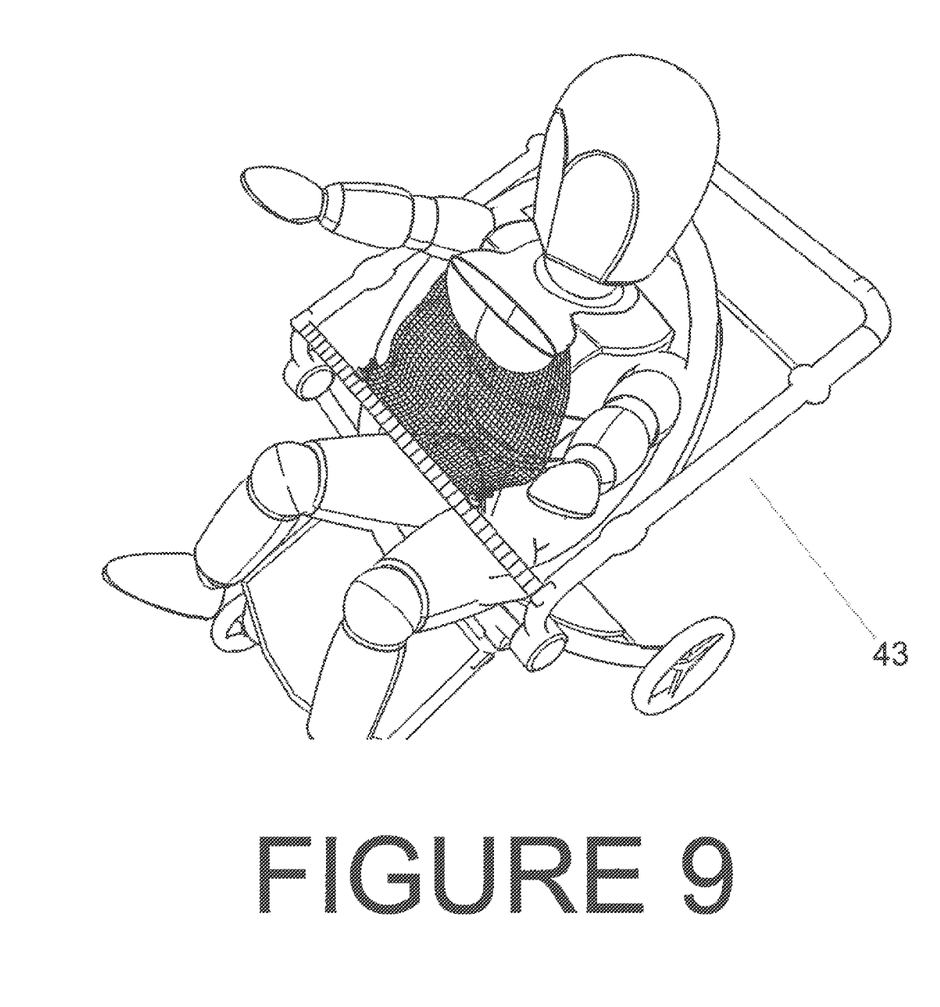
FIG. 9 shows a perspective view of a protection net combined with a baby bib while a baby is wearing a bib inside of baby carriage.

As shown in FIG. 9, it describes that a baby wears a baby bib as sitting inside the baby carriage 43. Differently from the case wherein a baby wears only a bib without a protection net, the present invention doubly prevents a baby from dropping toys or spoons down on the ground or floor, which is due to the wide size of protection net inside of the baby carriage.

What is claimed is:
1. A protection net, comprising:
   a purse in which the protection net could be stored;
   a connecting string, one end of the connecting string attached to inside of the purse and the other end of the connecting string attached to a rear side between a right and left rear corner of the protection net;
   a female and a male closer respectively connected to the right and the left rear corner through a first and a second string, respectively, the first and the second string surrounding a chair and the female and the male closer fixing the rear side of the protection net to a chair; and
   a first and a second clip directly connected to a right and a left front corner of the protection net, respectively and fixing a front side between the right and left front corner to an edge of a table to spread out the protection net between the user and the table;
   wherein both of the first and the second clip are opened in their no-holding state;
   wherein a length of each of the first and the second clip, in a direction perpendicular to the edge of the table, is larger than a gap distance between the front side of the protection net and the edge of the table;
   wherein the protection net has a rectangular shape, having the front side, the rear side, a right lateral side between the right front and right rear corner, and a left lateral side between the left front and left rear corner.

* * * * *